July 14, 1964   D. W. GRIMM   3,140,636
TWELVE-POINT NUT
Original Filed Nov. 14, 1957

INVENTOR.
DAVID W. GRIMM
BY
ATTORNEY

United States Patent Office 3,140,636
Patented July 14, 1964

3,140,636
TWELVE-POINT NUT
David W. Grimm, Fullerton, Calif., assignor, by mesne assignments, to Kaynar Mfg. Co., Inc., Pico-Rivera, Calif., a corporation of California
Continuation of application Ser. No. 696,503, Nov. 14, 1957. This application Sept. 20, 1962, Ser. No. 226,478
3 Claims. (Cl. 85—32)

This invention relates to threaded fasteners and more specifically to lock-nuts adapted for use in applying high tensile stresses to their mating bolts and which are of minimum weight and bulk so as to be especially adapted for use in applications requiring high resistance to stress and to loosening from vibration in aircraft constructions.

This application is a continuation of my application, Serial No. 696,503, filed November 14, 1957, now abandoned, for Twelve-Point Nut.

In the present state of development of the art, aircraft lock-nuts for normal purposes, based upon relatively thin and lightweight constructions, have come into extensive general use. However, for extraordinarily high tensile applications a relatively greater resistance to thread stripping due to axial forces and failure due to hoop tension is necessary, and so-called high-tensile nuts have been developed.

High-tensile nuts have been characterized by the provision of greater height to provide greater thread engagement area or by the provision of thicker or reinforced wall constructions, or both, and such factors tend to increase weight. In the effort to keep weight increase to a minimum the industry has resorted to increasing the number of sides of the outer perimeter of the nut beyond the conventional six sides (hexagon). This results in relatively thickening the least wall thickness of a given size nut. In view of the availability of socket type wrenches having twelve wrenching points, the so-called twelve-point nut (as discussed in U.S. Patent 2,588,372, issued to George H. Erb on March 11, 1952) has evolved and such constructions provide a relatively thicker minimum wall in a comparatively small perimetral form so that it is possible (as stated in the patent) to utilize standard socket wrenches one size less than usual for a given thread size. Moreover, such constructions have the important incidental advantage that more wrenching surfaces are provided, resulting in a greater number and area of wrench contacts to better enable high torques to be applied without injury either to the surface of the nuts or of the wrenching tools used thereon.

The disclosure of the Erb patent indicates that it was essential, in twelve-point lock-nuts, that the wall thickness be the maximum that would permit a wrench to engage the outer surface since the wall strength required was critical for the undersized outer perimeter involved, said outer surface being described by Erb as a double hexagon formed by "two hexagons offset circumferentially and providing an external configuration having an inscribed circle of a greater diameter than that of a single hexagon having the same distance across the flats," and this wall thickness was considered critical since it is included as a limitation in the claims of the patent. As described, this configuration, in a less than standard outer size, resulted in a weight saving over conventional-sized square and hexagonal nuts. However, the configuration is of maximum weight and bulk for a twelve-point perimetral form.

In the prior art, as represented by Erb, it was common to provide separate load carrying and locking portions of a nut. Thus, in the Erb construction, the locking feature, involving an additional axial length of the lock-nut, does not contribute to the axial stressing of the bolt. Accordingly, the stresses or load of the nut were entirely in the load-carrying portion and the walls of the load-carrying portion had to be at least as thick as claimed by Erb to obviate structural failure.

The Erb construction is typical of the known prior art in the separation of the loading and locking functions. Another example of the prior art is the so-called beam type which is an all metal construction wherein the locking end of the nut is formed with longitudinal slits and the resulting threaded strips or beams are bent slightly inwardly to cause a resilient gripping of a bolt threaded therethrough. In this last described form the slit portions provide no substantial resistance to hoop stresses, of course, and as a result the main body of the nut must be "beefed up" as much as possible, as in the Erb construction.

The present invention provides a construction wherein the weight of high-tensile nuts of the class described may be substantially reduced while providing improved resistance to failure of the nuts, and retaining the advantage of added wrenching surfaces of twelve-point configurations. This is accomplished by providing a locking feature which is capable of performing a load-carrying function as well as a locking function so that the load is distributed over the full length of the nut rather than only partially as in the prior art. As a result the main body of the nut is subject to less stress per unit height and for nuts of substantially the same height as prior art nuts, the wall thickness of the main body may be safely reduced to less than the critical minimum taught by Erb, with a substantial savings in weight.

As a related advantage of the present invention it is possible to form the nut body, the threads and the locking portion by working on the piece in a relatively soft state and subsequently hardening it to a greater degree than possible in the prior art whereby stronger structures are possible in a unitary construction, as distinguished from prior art multiple piece lock-nuts or prior art structures wherein the locking features are such as to place practical limitations on the hardness of the finished nut. Thus, the plastic insert of one type of lock-nut as embodied in Erb, cannot be subjected to heat treatment and the nut body, therefore, cannot be hardened after the operations involved in positioning the insert, and must be soft enough to permit forming operations incident to positioning the insert. Relative to the beam type of locking feature described hereinabove, excessive hardening causes brittleness and unduly high and irregular torque characteristics of the locking beams and such devices are not practically operable at unconventional hardnesses.

In the present invention the locking portion of the nut incorporates load-bearing threads which are a continuation of those of the main body of the nut, and the locking portion is of relatively thin construction and is imperforate and unbroken either radially or longitudinally. The overall construction may be hardened to ranges in excess of 36 on the Rockwell "C" scale in contradistinction to the old standard 28–32 Rockwell "C" as discussed in the Erb patent. The result of this greater hardness is a better over-all resilience for locking and for adaptation to thread tolerance variations and a greater strength per unit weight to give a novel construction of less weight and bulk and better operability than was possible in the prior art.

It is, therefore, an object of the present invention to provide high-tensile type lock-nuts of improved operating characteristics and of less weight and bulk than hitherto known.

A further object of this invention is to provide a twelve-point high-tensile type lock-nut wherein the wall thickness may be less than the minimum previously regarded as critical for such devices by persons skilled in this art.

Another object of this invention is to provide a high-tensile type lock-nut comprised of a single piece of metal formed and threaded in relatively soft condition and subsequently hardened to unconventional hardnesses.

Yet another object of the present invention is to provide novel high-tensile type lock-nut constructions wherein the locking portion of the nut serves as an unbroken continuation of the threads of the main body portion of the nut whereby to assist in performance of the load-bearing function of the nut.

Still another object of the invention is to provide a twelve-point lock-nut construction wherein the thinnest wall thickness is substantially the same as would exist for a simple hexagonal perimeter, thus providing the additional wrenching advantages of a twelve-point configuration with a minimum addition of weight to the structure.

Other objects and many of the attendant advantages of this invention will be readily appreciated as the same becomes better understood by reference to the following detailed description when considered in connection with the accompanying drawing in which like reference numerals designate like parts throughout the figures thereof and wherein.

Figure 1:
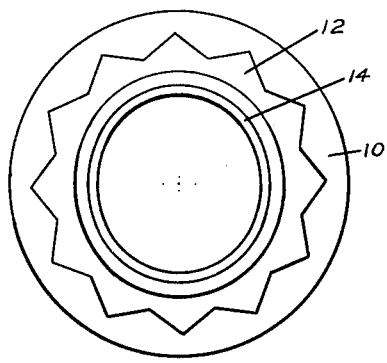
FIGURE 1 is a plan view of a preferred embodiment of a high-tensile nut according to this invention.
Figure 2:
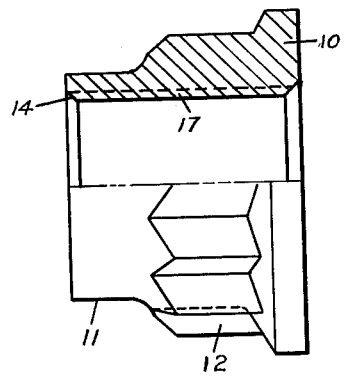
FIGURE 2 is a side elevation of the nut of FIGURE 1, with a portion thereof shown in section.

Referring now to the drawing, FIGURES 1 and 2 comprise an exemplary showing of a twelve-point high tensile type lock-nut according to the present invention. The nut is an internally threaded unitary piece of suitable material for the resilience and strength requirements desired. A wide variety of materials may be utilized, it being requisite only that they be selected in their optimum state of formability or machinability, provided such materials are of a type which can be strengthened and hardened to a desired degree by a subsequent process such as heat treatment. Examples of materials capable of having suitable qualities before and after treatment are carbon steels, beryllium-copper alloys, and some stainless steels. Of course, other relatively soft, ductile materials capable of being hardened and strengthened to a desired degree by subsequent treatment may also be used.

The nut of the present invention is an internally threaded unitary piece comprising an enlarged base member 10 which tapers upwardly and inwardly to a shank portion 11 which comprises a wreching portion 12, which is integral with the base at one end and an integral thin-walled locking portion 14 at its other end. The screw threads within the piece are indicated by the reference numeral 17, and are continuous from end to end of the nut.

The enlarged base portion 10 provides a flat enlarged bottom for bearing on the surface of the piece to which a connection is being made when tightened upon a bolt, and the additional material provided also serves to strengthen the nut at the point where it is most greatly loaded under stress. It is noteworthy that the base construction is integral with the shank portion 11 rather than a separate piece and this simplification of construction is made possible by the unconventional hardness of the metal of the entire nut which is elsewhere discussed, and obviates the necessity of employing a separate base ring of material harder than the remainder of the nut for base reinforcement.

Base 10 tapers upwardly and inwardly to the main body or wrenching portion 12 which is twelve-point external configuration and size for engagement by the equivalent points of standard socket wrench means of a size less than that which would normally be standard for the size and type of thread in the shank 11. The end of the wrenching portion 12 remote from the base flares inwardly to the thin-walled locking portion 14 of the nut.

Locking portion 14 is deformed at its extreme edge, after threading, to an elliptical configuration, and this deformation is generally gradual, causing gradual variation from perfectly round threads on the inner wall of the locking portion in the area of its juncture with the thicker wrenching portion to the most out-of-round thread at the extreme tip of the nut. By virtue of the thinness and resilience of the wall of the locking portion a bolt inserted through the nut gradually deforms the locking portion to a round form but the resilience of the walls exert gripping locking pressure on the bolt in their effort to return to the elliptical form. The continuous nature of the thread is such that some of the axial and hoop stresses are carried by the thread in the locking portion.

As pointed out in the introductory remarks of this specification, prior art development of nuts of the class under discussion, for aircraft usage, resulted in other sizes which were of less than standard size for the size thread involved in order to save weight but which had walls which were reinforced by a base ring and by the thickening resulting from using a double hexagonal perimetral form rather than the standard hex, to provide the necessary strength as well as the important incidental advantage of increasing the available wrenching surfaces. As previously pointed out, the wall thickness provided by the double hexagonal form was considered a critical minimum in the prior art. The gist of the present invention resides in my discovery that substantial weight savings may be made by further reduction of the minimum thickness of the wall (as by cutting the inner points of the outer configuration more deeply into the wall), while retaining the advantage of providing additional wrenching surfaces, by the provision of integral unitary locking means, such as the locking portion 14 of the present invention. As an added factor I have discovered that the use of such a locking feature allows hardening of the finished nut to Rockwell hardnesses in excess of 36 on the "C" scale and preferably in the range of 40 to 50 on the "C" scale, rather than to the 28 to 32 Rockwell "C" range previously imposed as a limitation on such lock-nuts by virtue of the nature of their constructions, and this added hardness results in strengthening the materials so that greater weight savings are possible without danger of failure of the nut construction.

In view of the above, the cross-sectional configuration of the wrenching portion of my novel nut construction may be in the form of a twelve-pointed figure wherein the inner points are defined by lines which are at substantially lesser angles than the 150° angle required as a critical parameter by the prior art. By virtue of the mechanical advantages attained by the imperforate integral locking device utilized in my novel nut construction and by virtue of the higher hardnesses made possible thereby I have found that the inner points may be more deeply situated to an extent wherein the surfaces defining the inner points are at angles of less than the previously critical 150° with one another. Thus, in its broadest form, my invention involves reduction of the wall thickness by reducing the included angle between the contiguous surfaces which define the inner points of an angle less than the 150° considered critical by the prior art. It may be determined geometrically that at an angle of 138° the wall thickness would be the same as for a hexagonal outer shape. However, in practice, in order to fully take advantage of the weight savings which are safely made possible by the present invention, it is preferable to reduce the angle substantially, to a range between 130° and 140° and, as a matter of fact, the nuts are manufactured with angles of 133° between the surfaces defining the inwardly directed points. This construction, of course, requires less material and has resulted in weight savings of about 25% as compared with equivalent prior art nuts, and such savings are extremely critical in aircraft usages.

Figure 3:
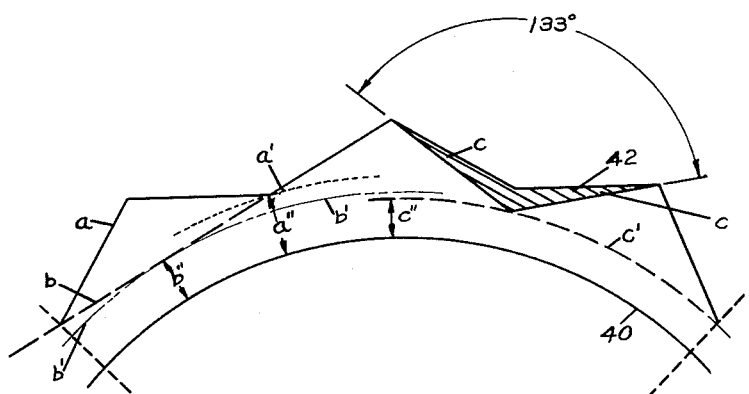
FIGURE 3 is a greatly enlarged schematic showing of comparative cross-sections of high-tensile nuts of the twelve-point type illustrating wall thicknesses of simple hexagon and double hexagon sections as compared with the wall thickness of the present invention.

Attention is directed to FIGURE 3 for a graphic comparison of the wall thickness standards involved in the prior art criteria and in the present construction. The fragmentary schematic showing includes an arc 40 representative of the inner wall of the nut. This arc may be assumed to be the position at a constant diameter of any selected reference point on the wall, such for example as the root or the crest of the internal thread in the nut of a size and type to receive a bolt of a standard size. A single hexagonal outer perimeter is simulated by the dash line b and the arc of a circle inscribed therein by b', the distance b" between the arc b' and the arc 40 representing the minimum wall thickness across the flats of the standard hexagonal perimetrical form. The dotted arc a' is representative of an arc of a circle inscribed within a double hexagonal form a, the distance a" representing the minimum wall thickness of the double-hex perimeter and graphically illustrating the greater thickness (and weight) evolved by devices such as that disclosed in the Erb patent discussed hereinabove. On the right side of the figure, the lines c are representative of the wall surfaces defining the inner points of the twelve-point configuration of the present invention, as described hereinabove and as shown in FIGURES 1 and 2, the hatched portion 42 representing material savings as compared with the double hexagonal form of Erb, for a preferred angularity of the wall surfaces of 133°. The arc c' is representative of an arc of a circle inscribed within a twelve-point configuration such as represented by cc (and by FIGURES 1 and 2) with the stated 133° angle between the walls, and the distance c" represents the minimum wall thickness for this configuration and is not only less for any given diameter of arc 40 than that indicated as a critical minimum by Erb (the distance a") but also less than that provided by an undersized hexagonal form (the distance b"). This is especially true if the nut is threaded to receive a bolt that is a normal standard size for the overall or diagonal dimension of a given nut having twelve points. Obviously, from the foregoing it may be seen that the advantage of additional wrenching surfaces has been preserved, while maintaining the strength of the nut and substantially reducing its weight, this result being attained by the novel combination of a unitary imperforate locking feature integral with the wrenching portion of the nut. The added features of unitary reinforcing base construction and high hardness are related adjuncts contributing to the improved results.

Nuts according to this invention are made of material such as 4340 alloy steel (for example) in a state soft enough to permit relatively easy working. The material is formed into a nut blank having a through bore and having the outer configuration herein described, either by a machining or forging operation. The blank is then threaded with a continuous thread and the locking end portion of the blank is then deformed to an elliptical shape which it holds because of the relatively soft state of the material. The finished blank is then subjected to treatment, such as heat treatment, to raise its hardness above 36 Rockwell "C" and preferably to a range between 40 and 50 Rockwell "C."

From the above it may be seen that I have disclosed high-tensile type lightweight lock-nut constructions particularly adapted for aircraft usages and which provide improved strength, weight and locking characteristics, by virtue of the novel combination of the various elements thereof.

While the invention has been described in detail with reference to one specific example, said example is intended to be illustrative rather than as limiting since various changes in structure and procedure are obviously within the scope of the present disclosure. Accordingly, it is to be understood that the present invention is not to be limited to the specific illustrative disclosure but rather by the scope and language of the appended claims.

I claim:
1. A high tensile strength lightweight lock-nut comprising: an internally threaded annulus having a main body portion with an outer wall configuration in the form of a regular polygon having twelve outwardly extending points of a size to be engaged by standard size wrench means of a size less than usual for the size thread involved, the contiguous wall surfaces between two successive outwardly extending points being at least in part substantially flat and lying in planes intersecting at an angle of about 130 degrees to 138 degrees, the wall of the nut at the intersection of such contiguous wall surfaces having a positive but minimum radial dimension throughout the axial extent of the intersection of the wall surfaces, as measured to the base of said threads, not greater than the radial distance between the base of said threads and a concentric circumscribing circle equal in radius to a circle inscribed in a regular hexagon having the same major diagonal dimension across points as the said regular polygon with twelve points.

2. A high tensile strength lightweight lock-nut comprising: an internally threaded annulus having a main body portion with an outer wall configuration in the form of a regular polygon having twelve outwardly extending points and of a size to be engaged by standard size wrench means of a size less than usual for the size thread involved, the contiguous wall surfaces between two adjacent outwardly extending points being at an angle of 130 to 138 degrees to one another, the intersection of such contiguous wall surfaces having a positive but minimum radial dimension throughout the axial extent of the intersection of the wall surfaces, as measured to the base of said threads, not greater than the radial distance between the base of said threads and a concentric circle equal in radius to a circle inscribed within a regular hexagon having the same major diagonal dimension as the said polygon with twelve points, said main body portion tapering into an internally threaded integral portion at one end thereof, said locking portion being relatively thinner than said main body portion, the locking portion and the thread within the locking portion being non-circular at the end thereof remote from the main body portion, said nut having a hardness above 36 Rockwell "C," whereby said locking portion exerts resilient locking force on a bolt threaded therethrough while simultaneously carrying a portion of the axial and hoop stresses of the nut to assist the main body portion of the nut in resisting said stresses, and whereby the weight of the nut may be reduced without strength reduction while providing resilience in the area of the main body portion for better conformation with the threads of matching bolts.

3. A high tensile strength lightweight lock-nut comprising: an internally threaded annulus having a main body portion, said main body portion having an enlarged integral base at one end thereof to provide a bearing surface and to reinforce the main body portion in the area of greater stress, said main body portion having an outer wall configuration in the form of a regular polygon having twelve outwardly extending points and of a size to be engaged by standard size wrench means of a size smaller than usual for the size thread involved, the contiguous wall surfaces between two adjacent outwardly extending points being at an angle of 130 to 138 degrees to one another, the intersection of such contiguous wall surfaces having a positive but minimum radial dimension throughout the axial extent of the intersection of the wall surfaces, as measured to the base of said threads, not greater than the radial distance between the base of said threads and a concentric circle equal in radius to a circle inscribed within a regular hexagon having the same major diagonal dimension as the said polygon, the other end of said main body portion tapering into an internally threaded integral circumferentially continuous resilient locking portion at one end thereof, said locking portion being relatively thinner than said main body portion, the locking portion and the thread within the locking portion being non-circular at the end thereof remote from the main body portion, whereby said locking portion exerts resilient locking force on a bolt threaded therethrough while simultaneously carrying a portion of the axial and hoop stresses of the nut to assist the main body portion of the nut in resisting said stresses, said nut having a hardness above 36 Rockwell "C."

References Cited in the file of this patent

UNITED STATES PATENTS

| | | |
|---|---|---|
| 2,125,276 | Green | Aug. 2, 1938 |
| 2,440,944 | Green | May 4, 1948 |
| 2,588,372 | Erb | Mar. 11, 1952 |
| 2,816,591 | Reiner | Dec. 17, 1957 |